(12) United States Patent
Dioguardi et al.

(10) Patent No.: US 8,094,915 B2
(45) Date of Patent: Jan. 10, 2012

(54) "IN VITRO" DIAGNOSTIC METHOD FOR DISEASES AFFECTING HUMAN OR ANIMAL TISSUES

(75) Inventors: Nicola Dioguardi, Milan (IT); Fabio Grizzi, Milan (IT); Carlo Russo, Corsico (IT); Barbara Franceschini, Pogliano Milanese (IT)

(73) Assignee: Humanitas Mirasole S.p.A., Rozzano (IT)

( * ) Notice: Subject to any disclaimer, the term of this patent is extended or adjusted under 35 U.S.C. 154(b) by 472 days.

(21) Appl. No.: 12/303,496

(22) PCT Filed: Jun. 5, 2006

(86) PCT No.: PCT/EP2006/062904
§ 371 (c)(1),
(2), (4) Date: May 19, 2009

(87) PCT Pub. No.: WO2007/140814
PCT Pub. Date: Dec. 13, 2007

(65) Prior Publication Data
US 2009/0232382 A1 Sep. 17, 2009

(51) Int. Cl.
*G06K 9/00* (2006.01)
(52) U.S. Cl. ........................................ 382/133
(58) Field of Classification Search ............... 382/128, 382/133
See application file for complete search history.

(56) References Cited

U.S. PATENT DOCUMENTS
7,483,554 B2 * 1/2009 Kotsianti et al. ............. 382/128
7,761,240 B2 * 7/2010 Saidi et al. ..................... 702/19

FOREIGN PATENT DOCUMENTS
WO WO 03/071468 8/2003

OTHER PUBLICATIONS

N. Dioguardi et al., "Fractal Dimension Rectified Meter for Quantification of Liver Fibrosis and Other Irregular Microscopic Objects" Analytical and Quantitative Cytology and Histology, vol. 25, No. 6, pp. 312-320, Dec. 2003.
N. Dioguardi et al., "Liver Fibrosis and Tissue Architectural Change Measurement Using Fractal-Rectified Metrics and Hurst's Exponent" World Journal of Gastroenterology, vol. 12, No. 14, pp. 2187-2194, Apr. 14, 2006.
N. Dioguardi et al., "Computer-Aided Morphometry of Liver Inflammation in Needle Biopsies" World Journal of Gastroenterology, vol. 11, No. 44, pp. 6995-7000, Nov. 28, 2005.

* cited by examiner

*Primary Examiner* — Marcos D. Pizarro
(74) *Attorney, Agent, or Firm* — Dickstein Shapiro LLP

(57) ABSTRACT

The present invention relates to an "in vitro" diagnostic method for diseases affecting human or animal tissues, in particular for the diagnosis of diseases involving inflammation and fibrosis in human or animals, more particularly for liver diseases. More particularly, the present invention relates to a method for diagnosing "in vitro" abnormal morphological conditions in human or animal tissues affected by a chronic inflammatory disease, which comprises observing an image of a biopsy sample of the human or animal body in which said abnormal condition can be detected and metrically quantifying said abnormal morphological condition, wherein said step of metrically quantifying comprises detecting the extent of the fibrotic and of the inflammatory tissue by means of: i) calculating the fractal corrected perimeter (Pf) and/or area (Af) of the collagen islets, and ii) calculating the percentage area of the clustered inflammatory cells by means of the formula ACINF/AB·100, wherein ACiNF is the actual area of the inflammatory cells belonging to clusters and AB is the area of the biopsy sample.

19 Claims, No Drawings

"IN VITRO" DIAGNOSTIC METHOD FOR DISEASES AFFECTING HUMAN OR ANIMAL TISSUES

The present invention relates to an "in vitro" diagnostic method for diseases affecting human or animal tissues, in particular for the diagnosis of diseases involving inflammation and fibrosis in human or animals, more particularly for liver diseases.

The present invention relates to the diagnosis of abnormal morphological conditions in human or animal beings by examination of a collagen-containing bioptic sample of a tissue, wherein the collagen spots as well as the inflammation mass are quantified by the method of the invention. With the term "abnormal condition" it is intended a pathological condition or a condition which gives rise to a pre- or post-pathological situation and for which an abnormal morphometry can be recognised. Such abnormal conditions may be, for example, oncological diseases, edemas, hematomes, acute or chronic inflammatory lesions and collagen diseases.

In a particular embodiment of the present invention, the affected tissue is a liver tissue.

The antiviral treatment of chronic hepatitis C is expensive, efficaceous in only 50% of cases and has sometimes major undesired side effects. The criteria for selecting the patients to treat is therefore a central problem whose solution is sought by evaluating the inflammatory lesions (grading) and fibrosis (staging) histologically observed in bioptic specimens.

It is known that many hepatic diseases are currently evaluated bioptically using typically sophisticated qualitative methods. A single bioptic sample is still the most effective means for obtaining the greatest amount of information for formulating a diagnosis of chronic hepatitis, excluding other diseases, hypothesizing the prognosis and defining therapeutic protocols. However, taking a bioptic sample is expensive, it is not devoid of risks and its results are not reliable insofar as they do not express real measures, but only semi-quantitative categories of severity whose evaluation entirely depends on the subjective skills of the pathologist.

The recently proposed alternative methods of estimating hepatic tissue inflammation by measuring the blood levels of molecules associated with the evolution of liver inflammation—including the used measurement of transaminase level—have not shown any univocal relationship with the disease progress.

Therefore, there are still uncertainties in estimating the evolution of the chronic hepatic process. A key element has proven to be the evaluation of fibrosis, i.e. the lesion commonly observable in the histological pattern of chronic hepatitis. The noticeable presence of collagen, in the shape of highly irregular scars spread in the portal spaces, is a product of the portal inflammation due to necrotic inflammation centers. The newly formed collagen grows into either thin fibers or variously thick sets that dry out the parenchyma. In more advanced stages of the disease, the fiber sets form portal-portal and central-portal links.

The main source of the above named uncertainties in the evaluation of the hepatic disease stage arises from the methods used to assess the fibrosis present in the hepatic tissue. Semi-quantitative methods, which are the most widely used, indicate categories of disease severity, but do not provide metrical measurements.

In addition, close to the larger collagen's fragments, we were able to detect, by means of a computer-assisted optical microscope recognition of specifically stained connectival tissues (Sirius Red or other specific stains), a pletora of extremely small and highly indented fragments, which are otherwise invisible to routine observation. Evaluation of such minor fragments, which has not been made by the diagnostic methods used up to now, is of pivotal importance since the presence of such fragments is an index of a dynamic evolution of the pathology.

In fact, the initial three-dimensional configuration of the collagen structure is a dispersed set of small collagen islets that evolve with the disease into a spongy mass (fibrosis) due to the splicing of distal ends of the growing collagen fibers fuelled by the chronic inflammatory process. In two-dimensional histological liver slices, this spongy mass appears as very wrinkled collagen areas irregularly distributed in the tissue.

In general, the standardization of the bioptic sample is still an unsolved problem. A high morphological complexity characterises hepatic inflammation, fibrosis and configuration of hepatic tissue.

Analogously, complex features can be found in other diseases that involve chronic inflammatory processes, such as pancreatitis, gastritis and prostatitis.

The three characteristic parameters that qualify the histological analysis of cronic inflammatory processes are: i) the area covered by the inflammatory cell clusters and by the isolated inflammatory cells, i.e. the so called "inflammatory tissue"; ii) the area covered by the collagen islets of different magnitude; and iii) the tissue conformation, whose typical disorder in the damaged tissue is caused by the loss of the correct ratio between fibrotic tissue and parenchymal tissue bringing to the breaking of the lobular architecture. This is particularly true in the case of hrpatic tissue.

Morphometrical methods have proved to be unsuitable for measuring the irregular shapes of fibrosis because of the fact that Euclidean geometry can not be applied to such shapes. Euclidean geometry is conversely apt for measuring points, regular lines, planes and volumetric bodies whose dimensions are respectively expressed by means of integers 0, 1, 2 and 3 and whose shape does not change upon optical magnification.

The microscopic observation of either a normal or abnormal component of tissue samples taken from liver shows a number of new irregularities that appear at any magnification (scale of observation). As the extension form of the image of the samples changes, the new irregular details are given measures and dimensions that are independent at each magnification and can not be arranged in a single linear system. Because of this characteristic, which is due to the roughness of the external surface of the object to be observed, the visible details, as well as those that can not be visually identified, make hepatic tissue samples (like all other tissues affected by chronic inflammatory processes) hardly measurable by means of traditional computer-aided morphometry.

The difficulties encountered in metrically measuring the shapes of the collagen present in the bioptic sample of a tissue depend on:

the irregularities of the outlines that do not allow collimations with the smooth shape of the linear method;

the modification of the shape of these objects at every scale of observation, because of newly appeared details that can not be observed at the previous magnification;

the dimensional change of the space occupied by the sample at every magnification, as a function of the change in shape;

the multiplicity of the perimetric lengths and surface areas, whose dimensions scale with the resolution of the measure (the smaller the meter, the higher the measure).

The classical morphometry tackles the problem of measuring natural objects by approximating their irregular outlines and rough surfaces to rectilinear outlines and plane surfaces. In addition, there is the well known non-representative nature of a bioptic sample as its small volume makes the so-called disease staging hardly indicative because of the unevenness of the distribution of lesions in the organ as a whole. It is known that only a slight difference in the site from which a bioptic fragment is taken is often sufficient to obtain a sample that indicates a different stage from the one of the adjacent tissue.

As far as the metrical analysis of a necro-inflammatory tissue is concerned, no quantitative methods have been developed so far.

Also, quantitative methods for metering the architectural alterations of the altered tissue that account for the tissue disorder, are not known.

The purpose of the present invention is therefore to provide a diagnostic method that, although starting from a tissue sample taken in accordance with the state of the art, allows a complete and precise diagnosis of the patient's current pathological status and its evolution.

According to the present invention, this object is achieved by means of an in vitro diagnostic method whose characteristics are specified in the main claim. Further characteristics of the method of the present invention are specified in the subsequent claims.

Irregular objects were defined "fractal" by Benoit Mandelbrot since, in spite of the fact that their shape changes as a function of magnification, they retain the features of their irregularity at all spatial scales. Although the pieces (not fractions) into which they can be divided are not equal, they preserve the similitude of their irregularity. This property of the parts into which irregular objects can be divided is called "self-similarity". Since the shape of such objects depends on the magnification at which their image is observed, any quantitative metering of the dimensions of the object is a function of the magnification scale. The fractal dimension indicates therefore the "self-similarity" of the fractal pieces of an irregular body and, at each scale, defines the characteristics of the reference means used to measure the physical and geometrical parameters of the observed irregular object.

The present invention is based on the intuition of the inventors concerning the metric quantification of the tissue spot, as well as any irregular object, itself.

The inventors have also surprisingly found that the "rugosity", a specific characteristic of the surface of the collagenic structures present in the hepatic as well as in other tissues with chronic inflammation, can be metrically quantified. As a matter of fact the inventors have developed an algorithm that makes it possible to evaluate the said "rugosity" by means of measurements of the true perimeter and area of the collagenic structures present in the tissue.

The method of the invention also allows to quantify the area of the inflammatory tissue formed by the area of the inflammatory cell clusters and by the area of the isolated inflammatory cells.

The method of the invention also provides an index of the tissue disorder that definitely gives information on the status of progression of the inflammatory disease.

The diagnostic method according to the present invention provides for the use of a microscope with a motorized stage and a computer. The microscope is used to examine visually the bioptic sample, while a specific software is employed to capture and convert the optical image to a digital image that allows the further measurements and subsequent calculations to be performed.

The bioptic sample is taken by means of conventional bioptic methods and is used to prepare, in a known manner, a slide in which the collagen present in the tissue is hystochemically stained or immunohystochemically labelled. An operational stratagem of the method according to the present invention is to stain the collagen present in the sample on the slide by using a standardised stain for which the intervals of the three primary colours (red, green and blue) are well known.

The preferred stain is Sirius Red, also known as Direct Red 80, which has a threshold for each primary colour that varies between a minimum value of 0 and a maximum value of 255 intensity units (24 bit depth, 16 million colours BITMAP image analysis). Each of appropriately stained biological structures is characterised by a specific staining interval. In the case of Sirius Red-stained collagen, the thresholds are 0-255 intensity units for red (R), 0-130 intensity units for green (G) and 0-255 intensity units for blue (B). The selection of collagen present in the tissue on the slide can be automatically performed by the computer once the operator has set the three specific thresholds for the three primary colours.

The inflammatory cells are phanerised by treatment of the histological section with primary antibodies anti-human LCA (monoclonal mouse anti-leukocyte common antigen). Typically, the treatment lasts for one hour at room temperature. 1 mg/ml mouse IgG1 is normally used as a negative control.

In order to distinguish settled macrophagic mesenchymal Kupffer cells from recruited inflammatory T cells, a further section of the histological sample was immersed in an antigen retrieval bath (typically, for 30 minutes at 98° C. in 1 mM of a freshly made EDTA solution). The inflammatory T cells are phanerised using primary antibodies anti-human CD3 and the Kupffer cells by treatment with primary antibodies anti-human CD68, at room temperature. 1 mg/ml mouse IgG1 is used as a negative control.

The hystological sections are then stained by incubation. Fast red was used as a chromogen to yield the red reaction products for CD68, while 3,3'-diaminobenzidine tetrahydrochloride is used to yield the brown reaction products for LCA and CD3.

The nuclei are lightly counterstained with Harris's hematoxylin solution.

After histochemical staining or immunohistochemical labelling, the slide with the bioptic sample or one of its parts is placed on the motorized stage of a microscope connected to a computer through a tele/photo camera. The apparatus that can be used in the method of the present invention is the one described in the International application No. PCT/EP02/12951 filed on 19 Nov. 2002, whose description is herewith incorporated by reference.

This patent application describes a system for acquiring and processing an image comprising a microscope having a motorised scanning stage capable of moving along the Cartesian axis x, y, z. The microscope is preferably of the type that allow magnification of from 50× up to 1000×.

The microscope is provided with at least one object glass, at least one eyepiece and at least one photo-video port for camera attachment. To this latter, electronic image acquisition means, in particular a photo/video camera, are operatively connected. Preferably, such electronic image acquisition means are a digital camera, having more preferably a resolution of 1.3 Megapixels.

The electronic image acquisition means are operatively connected with a processing system. The processing system may be realized by means of a personal computer (PC) comprising a bus which interconnects a processing means, for example a central processing unit (CPU), to storing means, including, for example, a RAM working memory, a read-only memory (ROM)—which includes a basic program for starting the computer—, a magnetic hard disk, optionally a drive (DRV) for reading optical disks (CD-ROMs), optionally a drive for reading/writing floppy disks. Moreover, the processing system optionally comprises a MODEM or other network means for controlling communication with a telematics network, a keyboard controller, a mouse controller and a video controller. A keyboard, a mouse and a monitor 8 are connected to the respective controllers. The electronic image acquisition means are connected to the bus by means of an interface port (ITF). The scanning stage is also connected to the bus by means of a control interface port (CITF) by which the movement of the stage along the Cartesian axis is governed.

A program (PRG), which is loaded into the working memory during the execution stage, and a respective data base are stored on the hard disk. Typically, the program (PRG) is distributed on one or more CD-ROMs for the installation on the hard disk.

Similar considerations apply if the processing system has a different structure, for example, if it is constituted by a central unit to which various terminals are connected, or by a telematic computer network (such as Internet, Intranet, VPN), if it has other units (such as a printer), etc. Alternatively, the program is supplied on floppy disk, is pre-loaded onto the hard disk, or is stored on any other substrate which can be read by a computer, is sent to a user's computer by means of the telematics network, is broadcast by radio or, more generally, is supplied in any form which can be loaded directly into the working memory of the user's computer.

The movement of the motorized stage along the two main orthogonal axes x-y is automatically controlled by a specific software program. The whole image of the histological preparation is automatically reconstructed by the computer and recorded in the memory thereof as an image file.

Focusing of the image is also automatically performed.

The image file is then processed by the computer, that selects the parts of the tissue on the slide under examination that fall within the predetermined intervals for Sirius Red and therefore correspond to the collagen. By this operation, the collagenic structures present on the slide are selected from the image file and their perimeter and areas are exactly reproduced.

Also, the software automatically select the surface covered by the whole LCA-immunopositive inflammatory system.

Two kinds of calculation are thus made according to the method of the present invention. The first one involves the morphometric determination of the extent of fibrosis, by means of metrical measurement of the collagen spots and islets. The second calculation concerns the morphometric determination of the extent of inflammation. These two calculations will be dealt with separately herein below.

Metrical Measurement of Fibrosis

This procedure provides for the identification and calculation of the area occupied by the histological preparation as a whole and the area A occupied only by the collagenic structure under examination. The unit of measurement may be $\mu m^2$ or pixel. The area of a pixel is a known parameter that depends on several factors, such as the digital videocamera parameters, the magnification and the like. It is possible to convert pixel into $\mu m^2$ by making a calibration with a conventional "micrometric slide", i.e. a slide on which a micrometric scale is drawn, whose image is acquired as a standard for calibration. The area A of the structure under examination can be expressed in absolute terms or as a percentage of the total area of the sample under investigation. All measurements of the collagenic structure can be automatically made by the computer.

The perimeter P of the selected collagenic structure is likewise, and almost simultaneously, identified and calculated, according to a known computer-aided algorithm, and can also be measured in pixel or μm.

Given the considerable irregularity of the perimeter of the selected collagenic structure and in order to be able to meter it in concrete terms, an evaluation of its fractal dimension $D_P$, is made. Similarly, the estimate of the fractal dimension of the area of the selected collagenic structure is indicated by the symbol $D_A$. Both of these fractal dimensions can be automatically determined using the known "box-counting" algorithm.

According to the "box-counting" method, the image is divided into a grid and the fractal dimension D is given by the mathematical formula $$D = \lim(\epsilon \to 0)[\log N(\epsilon)/\log(1/\epsilon)]$$

wherein $\epsilon$ is the length of the side of the boxes of the grid and $N(\epsilon)$ is the number of boxes necessary to completely cover the outline ($D_P$) or the area ($D_A$), respectively, of the measured object. The length $\epsilon$ is expressed in pixel or μm and, in the present calculation method, $\epsilon$ tends to 1 pixel.

In order to avoid difficulties in such a calculation, the fractal dimensions $D_P$ and $D_A$ are approximated as the slope of the straight line obtained by putting in a Cartesian axis system the parameters $\log N(\epsilon)$ versus $\log(1/\epsilon)$.

In practice, the method used to determine $D_P$ comprises:
a) dividing the image of the object into a plurality of grids of boxes having a side length $\epsilon$, in which $\epsilon$ varies from a first value substantially corresponding to the side of the box in which said object is inscribed and a predefined value which is a fraction of said first value,
b) calculating a value of a logarithmic function of $N(\epsilon)$, in which $N(\epsilon)$ is the number of boxes necessary to completely cover the perimeter (P) of the object and of a logarithmic function of $1/\epsilon$ for each $\epsilon$ value of step a), thus obtaining a first set of values for said logarithmic function of $N(\epsilon)$ and a second set of values for said logarithmic function of $1/\epsilon$,
c) calculating the fractal dimension $D_P$ as the slope of the straight line interpolating said first set of values versus said second set of values of step b).

The same method is applied for calculating the fractal dimension $D_A$, with the only difference that, in this case, $N(\epsilon)$ is the number of boxes of side $\epsilon$ that completely cover the area of the object to be quantified.

From these calculations and applying the fractal geometry's principles, it derives that $$Pf = P \cdot [1 + \lambda_P(D_P - D)] \qquad (I)$$

wherein $P_F$ is the fractal-corrected perimeter, P is the Euclidean perimeter, $D_P$ is the fractal dimension, D is the Euclidean dimension (1) and $\lambda_P$ is the dilation coefficient. The value of $\lambda_P$ is empirically determined using a histological section acquired at different magnifications (5×, 10×, 20×, 40× objective magnification) and then observing new emerging details of the object under evaluation. The $\lambda_P$ is found to be approximately 4.5.

Analogously, Af, i.e. the corrected area of the irregular object to be observed, is given by the formula $$Af = A + [\lambda_A(D_A - D)] \cdot (Ap - A) \qquad (Ia)$$

wherein A is the Euclidean area, D is the Euclidean dimension (2), $\lambda_A$ is the dilation coefficient which was found to be approximately 0.1, Ap the area of the region including the objects to be quantified and $D_A$ is the fractal dimension of the area which is calculated by means of the box-counting method.

With the term "region including the objects to be quantified" it is intended the region of the image in which it is possible to detect objects, even of small magnitude, belonging to the same morphological item. It is in fact known that in some cases the object to be quantified is composed of a plurality of objects (spots or aggregates) of different magnitude, some of them being non detectable under visible analysis. This algorithm allows to take into consideration the overall area of the item under observation and in particular, if applied in the collagen analysis, it is possible to determine not only the area of the larger collagen spot, but also the area of the smallest islets.

It is clear that evaluation of the perimeter or, more particularly, of the area of the observed object can give a first diagnostic indication. The evaluation in a patient of the area of the collagen spot in samples taken at different times is indicative of the progression or regression of the disease.

After having calculated the above values, the aforesaid fundamental parameter of "rugosity" is determined. The inventors have found in fact that the parameter w indicating the degree of "rugosity" of the selected collagenic structure can be calculated by means of the following algorithm:

$$w = Pf/2\sqrt{Af \cdot \pi} - R \qquad (III)$$

wherein Pf is the rectified perimeter (fractal perimeter), Af is the fractal corrected area of the collagenic structure and R is the "roundness coefficient" of the collagen islets. R is on its turn calculated with the following algorithm $$R = Pe/2\sqrt{Ae \cdot \pi} \qquad (IV)$$

wherein Pe is the perimeter of the ellipse in which the measured object is inscribed and Ae its area.

Finally, once calculated the rugosity w of the collagenic structure present on the slide, the status of the structure and therefore the so-called staging of the hepatic pathology as a further confirmation. It has been found in fact that the value of rugosity w is associated with the stage of the chronic inflammatory pathology.

The diagnostic method according to the present invention can be further implemented with the determination of the distribution of collagen in the bioptic sample. This distribution is determined by sub-dividing the whole sample using a grid with a 200 µm squared mesh and by indicating the number n of the squares in the grid by the symbols from $A_1$ to $A_n$. The determination of the grid follows the geostatic rules for spatial samplings.

The local collagenic area in each square is measured and a calculation is made of the partial sums of the collagenic areas contained in the sequence $A_1$, $A_2$, $A_3$, ... $A_n$. Each partial result ($A_1$, $A_1+A_2$, $A_1+A_2+A_3$, $A_1+A_2+A_3+A_4$, etc.) is reported in a Cartesian system in which the abscissae express $A_n$ and the ordinates the quantity $a_n$ of collagen contained in $A_n$. This collagen distribution parameter, which takes into account all collagen islets, thus gives a fundamental diagnostic information, since it is correlated with the evolution of the disease.

Another complement of the diagnostic method according to the present invention is the determination of the internal tectonics of each slide-selected collagenic structure by evaluating the degree of RGB colour scale heterogeneity of the set of pixels making up each area. This value, which indicates a densitometric heterogeneity, can be automatically calculated by the computer and expressed by a dimensioned numerical value indicated by the letter I. The value of I corresponds to the percent of pixels that differ more than 5% from their mean value.

Metrical Measurement of Inflammation

The tissue lesions related to the inflammatory process at any given time cause variations in the concentration of some specific blood molecules. These molecules have been identified and proposed as disease indexes despite the fact that their concentration depend not only on the amount initially present, but also on the rate of their metabolism in the bloodstream. The functions correlating the concentration change of such molecules with time are so complicated, as they depend on the specific metabolic pattern which they are subjected to, that they are deprived of most of their significance and usefulness as a quantitative index of the disease status and progression.

The present inventors arrived to the conclusion that the only parameters that enable to describe the status of a chronic necro-inflammatory tissue lesion are those obtained by the measurement of the structural features of the tissue wherein the damage occurred. Due to the great number of different chronic inflammatory conditions affecting for example the hepatic tissue, it has been found that the metrical measurement of the area covered by the inflammatory cells and the density of such cells are the most characterizing features describing the clinical stage of the inflammatory process.

In practical terms, quantitatively estimating chronic hepatitis B and C virus-related inflammation on the basis of a histological section of liver tissue raises the problem of measuring the density of the cells aggregated in clusters and those isolated in the interstitium of the hepatic parenchyma. As the cells of the former group (lymphocytes, monocytes, plasma cells) and the latter (which also include Kupffer cells) have the same mesenchymal nature and a similar capacity of activation during disease, it can be reasonably inferred that the degree of activity of the chronic viral process can be estimated by measuring the metrical area occupied by these cells and their density within it.

Whatever the method used, it is difficult to determine the density of the punctiform particles representing the recruited inflammatory blood cells in a cluster, because it depends on the boundary of these basic elements of the chronic hepatitis virus-related process of liver tissue inflammation. The present inventors, after thourough experimentation, found that cell sequences characterised by intercellular distances of $\leq 20$ µm are representative of a cluster.

In chronic liver inflammation, portal, periportal and perilobular lymphocyte, plasma cell and monocyte/macrophage aggregates are present. The extent of intralobular focal necro-inflammation varied with the severity of the disease, with confluent necrosis expressing its most severe clinical exacerbation.

These cell conglomerates arise when the viral etiological agent creates damaged sites in the liver tissue consistent with hepatocyte necrosis. Each damaged site acts as an attraction point for the inflammatory cells always present within the liver tissue, so that lymphocytes, plasma cells and other white blood cells are recruited. These inflammatory cells end within the attraction basin created by the necroinflammatory process and form a cluster that marks the space covered by the inflammatory basin. The cell density of the cluster changes depending on the evolution of the inflammatory process.

Very similar behaviour is found in tissues affected by other chronic inflammatory diseases.

Differently from the fibrosis' calculation, the difficulty is here to identify the boundaries of each cluster. In the present invention, the triangulation method according to Delauney's algorithm was used.

Delauney's triangulation of a cluster of points, in general, provides for a collection of segments connecting each pair of points and satisfying the property of the so called "empty circle". That is to say for each segment it must be possible to find a circle containing only the apexes of that segment, but not other points of the cluster. This algorithm is well known and has been described in several publications: Guibas L. et al, "Primitives for the Manipulation of General Subdivision and the Computation of Voronoi Diagrams", ACT TOG, 4(2), April 1985; Fortune S., "A Sweepline Algorithm for Voronoi Diagrams", Algorithmica, 2:153-174, 1987; Leach G., "Improving Worst-Case Optimal Delauney Triangulation Algorithms", 4th Canadian Conference on Computational Geometry, 1992.

Therefore, each inflammatory cell on the surface of the histological specimen was considered as a node of a continuous framework covering the entire section made of very irregular triangular sections in which each triangle has a common side with one adjacent triangle. The border of the cluster was arbitrarily identified with the continuous line formed by the most external triangle sides with a length of $\leq 20$ μm, corresponding to about twice the diameter of a lymphocyte (7-12 μm). All the points (cells) circumscribed by this border were considered as belonging to the subset I of cluster-resident cells, while the points connected by longer segments were considered to be non-clustered inflammatory cells (subset II).

Two different measurements are made according to the method of the invention. The first one consists in calculating the whole area occupied by the cluster of inflammatory cells, i.e. the area $A_C$ of the surface delimited by the borderline obtained with the Delauney's triangulation algorithm. The second measurement relates to the calculation of the area $A_{CINF}$ that is the area resulting from the sum of the actual areas of each inflammatory cell inside the cluster (subset I). The area $A_{CINF}$ can be calculated by multiplying the number of the pixels identifying the inflammatory cells for the area of a pixel, analogously to the calculation of the area of the collagenic tissue above. Moreover, the area of the biopsy sample is also calculated and defined as $A_B$.

It is further calculated the area $A_{PINF}$ of the cells outside the cluster (subset II), from which the total area covered by the inflammatory cells is obtained as $$A_{TINF} = A_{CINF} + A_{PINF}$$

Only clusters with at least three inflammatory cells are considered. The others are considered as random unitary cells.

As a further parameter, the rate $A_{CINF}/A_C$ is obtained indicating the density of the clustered cells in the clusters.

A separate counting of inflammatory T cells and Kupffer cells is also made. The two kinds of cells are discriminated by means of immunohistochemistry methods depicted above.

Determination of Hurst's Coefficient

Obtaining an index of the tissue disorder in the course of a chronic inflammatory disease such as an hepatic disease is a very important target. Architectural alterations of the hepatic tissue that normally occur in such conditions are indicative of the clinical stage of the disease and furnish a valuable diagnostic parameter to the clinician.

The present inventors made a statistical analysis on hepatic bioptic samples of healthy individuals in order to evaluate the percentage of collagen and parenchyma in normal tissues. These measurements were made according to the methods described above and gave the following values:

1.34-3.00% of fibrotic tissue
98.66-97% of parenchymal tissue

The rate between the above values is altered when the hepatic tissue is subjected to a disease.

Analogous behaviour is found in the other chronic inflammatory diseases.

As an index of such alterations and thus of the stage of the chronic inflammatory disease, it has been found the Hurst's coefficient to be highly representative:

$$H = E + (1-D)$$

wherein H is the Hurst's coefficient, E is the Euclidean dimension (1 for a line, 2 for a plane) and D is the fractal dimension of the surface covered by the whole LCA-immunopositive inflammatory system (area $A_{TINF}$) or the area covered by fibrosis (area $A_f$) which are calculated according to the methods described above.

Thus, $H_i$ and $H_f$ are calculated, wherein $H_i$ is the Hurst index for the inflammatory tissue, while $H_f$ is the Hurst index for the fibrotic tissue:

$$H_i = E + (1-D_i), \text{ and}$$

$$H_f = E + (1-D_f)$$

$D_i$ and $D_f$ are the fractal dimension for the inflammatory tissue and for the fibrotic tissue, respectively.

The Hurst indexes $H_i$ and $H_f$ give useful indications on the progression of the disease. For example, high $H_i$ index ($H_i$ approaching 1) are indicative of the existence of several hotbeds of inflammation, thus underlying a worse conditions than the case wherein the same total area of inflammation ($A_{TINF}$) corresponds to a lower $H_i$ (few or only one hotbed of inflammation).

The same considerations apply for $H_f$ for the fobrotic tissue.

Two sets of values were considered. The set of high Hurst's coefficient values (0.5<H<1.0) is indicative of a low number of inflammatory cells in the tissue (natural state or first stage of the disease). The set of low Hurst's coefficient values (0<H<0.5) is conversely indicative of the presence of many inflammatory cells that account for a severe inflammatory disease.

All the above mentioned parameters can be calculated automatically by the computer implemented with a software and executed in a short time.

A particularly suitable software to be applied in the diagnostic method of the present invention, as far as the calculation of the fibrosis parameters, is disclosed in the International publication no. WO 03/071468 in the name of the present Applicant. As for the calculation of the inflammation parameters, a suitable software is disclosed in PCT/EP2006/060323 of 28 Feb. 2006.

The parameters obtained according to the method described above can be displayed in a chart that, in the case of hepatic tissue, we called "hepatometer", i.e. a collection of data illustrating the disease stage, wherein the data are arranged in tables, diagrams, spectra, graphs and the like, in order to give immediate access to the relevant information useful for the diagnosis.

In particular, such hepatometer will contain the following parameters:

Inflammation Parameters

A1) Area of the inflammatory tissue ($A_{TINF}$), preferably expressed in mm$^2$;

B1) Percentage of biopsy sample surface which is occupied by the inflammatory tissue formed by the clusters ($A_C/A_B \cdot 100$). In this case, only clusters with at least 25 cells are taken into account;

C1) Percentage of the purely cellular area of the cell clusters with respect to the area of the biopsy sample ($A_{CINF}/$ $A_B \cdot 100$). It depends on the number of cells inside the cluster, and is thus indicative of the "activity" of the inflammatory process;

D1) Ratio between the actual area covered by the cells resident in the clusters and the area of the clusters: density ($A_{CINF}/A_C$);

E1) Percentage of the area of non-resident inflammatory cells (non-clustered cells) with respect to the total area of the biopy sample ($A_{PINF}/A_B$);

F1) Rate between T limphocytes and Kupffer cells, expressed as an absolute count of the cells of each kind in the sample and/or as a ratio between the two values. The T lymphocyte count is indicative of the attractive potential of the inflammatory basin, while Kupffer cells count give information on the collagenopoietic activity level of the inflammatory basin;

G1) Hurst's coefficient ($H_i = E + (1-D)$), that can range from 0 to 1. It gives indication on the heterogeneity of the spatial configuration of the observed fibrotic tissue.

Fibrosis Parameters

A2) Fractal dimension (D);

B2) Corrected area of the fibrotic tissue (Af), preferably expressed in $mm^2$ and percentage of such area with respect to the area of the biopsy sample ($Af/A_B \cdot 100$);

C2) Corrected perimeter of the fibrotic tissue (Pf) as a sum of the perimeters of the collagen islets, preferably expressed in mm;

D2) Staging of the fibrosis, determined by comparing the % Af calculated in B2) with a standard value. 50% of fibrotic area is considered to be a severe degree of disease;

E2) Number of collagen islets ($N_C$);

F2) Density ($\rho$) of collagen islets ($N_C/Af$), that gives indication of the stage of the disease (higher density means an advanced stage of disease);

G2) Percentage of collagen islets subdivided in three magnitude categories:
  i) $10-10^3 \mu m^2$
  ii) $10^3-10^4 \mu m^2$
  iii) $10^4-10^5 \mu m^2$ This parameter give indication on the stability of the system: the higher the percentage of the smaller islets, the more evolving the fibrotic process;

H2) Wrinkledness or "rugosity" given as a ratio Pf/Af;

I2) Wrinkledness or "rugosity" index (w). The higher w, the younger the fibrosis stage. W value decreases as the thinnest collagen fibres disappear while the disease progresses L2) Hurst's coefficient ($H_f = E + (1-D)$), that can range from 0 to 1. It gives indication on the heterogeneity of the spatial configuration of the observed inflammatory tissue.

In the above calculations, the area values of the sample ($A_C$, $A_B$, $A_{CINF}$, $A_{PINF}$, $A_{TINF}$) are obtained by multiplying the number of pixels that correspond to the quantified object for the area of a pixel, as described above.

The above diagnostic chart is designed to give a picture of a particular biopsy sample. However, diagnostic charts that summarise data taken in the course of the disease from several biopsy samples by the same patient, in order to show the disease progression, are also encompassed in the scope of the present invention.

In a particular embodiment of the present invention, the "in vitro" diagnostic method is further implemented by taking into account the fact that the quantitative morphological measures of the components of the biopsy sample may be influenced not only by their irregularity, but also by the artefacts created by the squeezing, tearing and twisting occuring during surgical excision and histological manipulations. The correction factor CF can thus be calculated by the following formula $$CF = jm/L$$

wherein jm is the square root of the mean squared area of normal tissue cells, and L is the square root of the mean squared area of the tissue cells of the sample under observation.

The parameter jm, which represents the side length of the square having the same area of a standard tissue cell (in the case of liver tissue, an hepatocyte), was calculated over a large number (about 3,000) of samples belonging to healthy subjects and in the case of an hepatocyte can be approximated to 16 μm.

The fractal perimeter Pf further corrected by such a correction factor can thus be obtained by the formula $$Pcor = Pf \cdot CF \quad (VI)$$

Analogously, the corrected area is given by $$Acor = Af \cdot CF^2 \quad (VII)$$

The above calculated coefficient of wrinkledness w can also be corrected by substituting Pf with Pcor and Ac with Acor in the above formula (III).

From what has been said above, it is clear that the diagnostic method of the invention represents an improvement if compared with the known methods. The fractal geometry offers mathematical models derived from the infinitesimal calculus that, when applied to Euclidean geometry, integrate the figures of the morphometrical measurements of natural and irregular objects, thus making them closer to the actual values.

The diagnostic method according to the present invention has the advantage to eliminate the inconveniencies of all the methods so far used for examining bioptic samples of chronic inflammatory tissues.

Any reference made above on a computer-aided, automatic determination of the magnitude and dimension of the observed object should be understood as a particular embodiment of the invention. It is clear in fact that the same operations can be performed manually, for example by reporting the image on a sheet, subdividing the image in a grid and applying the known algorithms in a manual method.

Further advantages and characteristics of the procedure according to the present invention will be evident to those skilled in the art from the following operative examples and the attached FIGS. 1, 2 and 3 that show collagen spatial distribution in three patients' samples.

EXAMPLE

The histological sections were digitised using an image analysis system consisting of a Leica DMLA microscope equipped with an x-y translating stage, a digital camera Leica DC200 and an Intel Dual Pentium IV, 660 MHz computer with ad hoc constructed image analysis software.

A standard bioptic sample was taken from three different patients with chronic HCV-related disease. The approximately 10 μm long sample was set in 10% formalin and embedded in Paraplast. After the Paraplast was removed, 5 μm thick sections were cut and stained with Sirius Red. The slides were microscopically observed at a 200× magnification using an image analysis system and all the images were digitalised.

The portion of liver subject to fibrosis was automatically selected on the basis of the similarities of colours of adjacent pixels. The images were then converted into 1-bit (black and white) binary images. The tolerance thereshold was adjusted in such a way as to select all the fibrotic lesions.

The individual pixel boundaries of the perimeter and surface area of the fibrotic portion were automatically traced using the known "box-counting" algorithm and their fractal dimension was determined. The fractal dimension was automatically measured using the "box-counting" method. The morphometrical values (A, P, Af, Pf) were then determined and, on their basis, the computer calculated the degree of rugosity w. The computer also calculated the spatial distribution of the collagen (see FIGS. 1-3) as well as the values of H and I by using a computer-assisted image analysis system.

The collected data are shown in the following table which lists the various morphometric values:

TABLE 1

| Sample | Af | Pf | $D_A$ | $D_P$ | W | H | I |
|---|---|---|---|---|---|---|---|
| 1 | 1729399 | 270291 | 1.296 | 1.147 | 38.56 | 0.853 | 0.0017 |
| 2 | 3796446 | 830485 | 1.609 | 1.509 | 1082.58 | 0.491 | 0.056 |
| 3 | 47364931 | 12675357 | 1.784 | 1.724 | 62421.72 | 0.276 | 0.039 |

The table shows that the rugosity value for the first patient was 38.56, which corresponds to an initial stage of hepatic pathology.

In the case of the second patient, the quantified rugosity of collagen was 1082.58, which indicates an intermediate stage of hepatic fibrosis.

The calculated rugosity for the third patient was 62421.72, thus indicating the presence of cirrhosis.

The graph in FIG. 1, which relates to the first patient, shows a stepped state that confirms the initial stage of the disease.

The graph in FIG. 2 (second patient) shows that the spatial distribution of collagen has fewer steps and therefore confirms an intermediate stage of the disease.

The graph in FIG. 3 (third patient) has an almost linear trend that confirms an advanced disease stage. The spatial distribution of collagen in a healthy liver is along a curve consisting of rather regular steps.

In general, in the case of collagen determination in hepatic diseases, the evaluation of the disease stage can also be effected by determining the coefficient of rugosity w of the patient and comparing it with predefined values, wherein w values below the predefined threshold value are indicative of the stage of the pathology.

Said predefined threshold values are determined by statistical analysis of the test results collected from a statistically significant patient population, wherein liver samples from the patients have been subjected to observation and parameter determinations according to the invention method.

Table 2 reports three prototypical examples of quantification of liver inflammation by use the method above described.

TABLE 2

| Sample | A % | Ac % | Ap % | Atr % | Ac/Atr | H |
|---|---|---|---|---|---|---|
| 1 | 1.00 | 0.35 | 0.65 | 1.12 | 0.58 | 0.68 |
| 2 | 10.84 | 9.38 | 1.46 | 17.86 | 0.53 | 0.36 |
| 3 | 18.58 | 15.36 | 3.22 | 33.74 | 0.46 | 0.47 |

The different values indicates that the mathematical method of the invention is suitable for objectively quantifying the inflammatory reaction, not only in liver but also in other inflamed organs.

The above description of the diagnostic method of the invention, as well as the data of the operative example shown above in the table and figures, refer to the "in vitro" diagnosis of hepatic pathologies by means of the metric quantification of collagen and of inflammation basin. It is obvious that the same metric quantification of collagen and of the inflammation stage can be used to make diagnosis and prognosis of other chronic inflammatory pathologies by the analysis of bioptic samples of a patient.

The invention claimed is:

1. Method for diagnosing "in vitro" abnormal morphological conditions in human or animal tissues affected by a chronic inflammatory disease, which comprises observing an image of a biopsy sample of the human or animal body in which said abnormal condition can be detected and metrically quantifying said abnormal morphological condition, wherein said step of metrically quantifying comprises detecting the extent of the fibrotic and of the inflammatory tissue by means of: i) calculating the fractal corrected perimeter (Pf) and/or area (Af) of the collagen islets, and ii) calculating the percentage area of the clustered inflammatory cells by means of the formula $A_{CINF}/A_B \cdot 100$, wherein $A_{CINF}$ is the actual area of the inflammatory cells belonging to clusters and $A_B$ is the area of the biopsy sample.

2. The method according to claim 1 wherein said stage i) of calculating the fractal corrected area (AD of the collagen islets comprises calculating the fractal dimension of the area of the object to be quantified by:
   a) dividing the image of the object into a plurality of grids of boxes having a side length ϵ, in which ϵ varies from a first value substantially corresponding to the side of the box in which said object is inscribed and a predefined value which is a fraction of said first value,
   b) calculating a value of a logarithmic function of N(ϵ), in which N(ϵ) is the number of boxes necessary to completely cover the area (A) of the object and of a logarithmic function of 1/ϵ for each s value of step a), thus obtaining a first set of values for said logarithmic function of N(ϵ) and a second set of values for said logarithmic function of 1/ϵ,
   c) calculating said fractal dimension $D_A$ as the slope of the straight line interpolating said first set of values versus said second set of values of step b).

3. The method according to, claim 1, wherein said fractal corrected perimeter (Pf) and/or area (Af) of said object are calculated, respectively, by applying the following formula (I):

$$Pf = P \cdot [1 + \lambda_P(D_P - D)] \qquad (I)$$

wherein Pf is the fractal-corrected perimeter, P is the Euclidean perimeter, $D_P$ is the fractal dimension, D is the Euclidean dimension (1) and $\lambda_P$ is the dilation coefficient, or the following formula (Ia):

$$Af = A + [\lambda_A(D_A - D)] \cdot (Ap - A) \qquad (Ia)$$

wherein A is the Euclidean area, D is the Euclidean dimension (2), $\lambda_A$ is the dilation coefficient, Ap is the area of the region including the objects to be quantified and $D_A$ is the fractal dimension of the area.

4. The method according to claim 1, comprising the steps of:
   1) calculating the "rugosity coefficient" w according to the following formula (III):

$$w = Pf/2\sqrt{Af \cdot \pi} - R \qquad (III)$$

wherein Pf is the fractal corrected perimeter, Af is the fractal corrected area of the collagenic structure and R is the "roundness coefficient" of the collagen islets, given by the following formula (IV):

$$R = Pe/2\sqrt{Ae \cdot \pi} \quad \text{(IV)}$$

in which Pe is the perimeter of the ellipse in which the object to be quantified is inscribed and Ae its area; and
2) comparing said coefficient w calculated in step 1) with predefined threshold values.

5. The method according to claim 1, further comprising the step of calculating the distribution of collagen spots in the observed image, said step of calculating the distribution of collagen comprising:
   sub-dividing the whole image using a grid with a 200 µm squared mesh,
   indicating the number n of the squares in the grid by the symbols from $A_1$ to $A_n$,
   measuring by the method of the preceding claims the local collagenic area in each square,
   calculating the partial sums of the collagenic areas contained in the sequence $A_1, A_2, A_3, \ldots A_n$,
   reporting each partial result ($A_1, A_1+A_2, A_1+A_2+A_3, A_1+A_2+A_3+A_4$, etc.) in a Cartesian system in which the abscissae express $A_n$ and the ordinates the quantity $a_n$ of collagen contained in $A_n$.

6. The method according to claim 1, further comprising evaluating the degree of RGB colour scale heterogeneity (I) of the set of pixels making up each area corresponding to the percent of pixels that differ more than 5% from their mean value.

7. The method according to claim 1, wherein the area A of the collagen islets and $A_{CINF}$ of the clustered inflammatory cells are calculated by multiplying the number of the pixels identifying the collagen islets and the inflammatory cells, respectively, for the area of a pixel, and wherein the perimeter P of the collagen islets is calculated by multiplying the number of pixels identifying the perimeter of the collagen islets for the side length of a pixel, wherein the side length and the area of a pixel are obtained by making a calibration with a micrometric scale.

8. The method according to claim 1, further comprising the calculation of one or more of the following parameters:
   Staging of the fibrosis, determined by comparing the % Af calculated as $Af/A_B\%$ with a standard value, wherein 50% of fibrotic area is considered to be a severe degree of disease;
   Number of collagen islets $N_C$;
   Density ρ of collagen islets given as $N_C/Af$;
   Percentage of collagen islets subdivided in three magnitude categories:
   i) $10-10^3$ µm²
   ii) $10^3-10^4$ µm²
   iii) $10^4-10^6$ µm².

9. The method according to claim 1, further comprising a step of correcting the fractal area Af and/or fractal perimeter Pf of said collagen spots by a correction factor CF which is indicative of the modification to which the hepatic tissue is subject during preparation of the sample, including:
   calculating said correction factor CF by the following formula $$CF = jm/L$$

wherein jm is the square root of the mean squared area of a normal hepatocyte, and
   L is the square root of the mean squared area of the hepatocytes of the sample under observation,
   calculating the corrected fractal perimeter Pf by the formula (VI)

$$Pcor = Pf \cdot CF \quad \text{(VI)}$$

and calculating the corrected fractal area Af by the formula (VII)

$$Acor = Af \cdot CF^2. \quad \text{(VII)}$$

10. The method according to claim 1, wherein said image is a digital image.

11. The method according to claim 1, wherein said image is a microscopic image.

12. The method of claim 1, wherein said stage i) of calculating the fractal corrected perimeter (Pf) of the collagen islets comprises calculating the fractal dimension of the perimeter of the object to be quantified by:
   a) dividing the image of the object into a plurality of grids of boxes having a side length ε, in which ε varies from a first value substantially corresponding to the side of the box in which said object is inscribed and a predefined value which is a fraction of said first value,
   b) calculating a value of a logarithmic function of N(ε), in which N(ε) is the number of boxes necessary to completely cover the perimeter (P) of the object and of a logarithmic function of 1/ε for each c value of step a), thus obtaining a first set of values for said logarithmic function of N(ε) and a second set of values for said logarithmic function of 1/ε,
   c) calculating said fractal dimension $D_P$ as the slope of the straight line interpolating said first set of values versus said second set of values of step b).

13. The method according to claim 12, wherein said predefined value of ε in step a) is 1 pixel.

14. The method according to claim 1, comprising in addition the calculation of one or more of the following parameters:
   Area of the inflammatory tissue ($A_{TINF}$);
   Percentage of biopsy sample surface which is occupied by the inflammatory tissue formed by the clusters ($A_C/A_B \cdot 100$), wherein only clusters with at least 25 cells are taken into account;
   Density $A_{CINF}/A_C$ given as the ratio between the actual area covered by the cells resident in the clusters and the area of the clusters;
   Percentage of the area of non-clustered cells with respect to the total area of the biopy sample $A_{PINF}/A_B$;
   Rate between T limphocytes and Kupffer cells, expressed as an absolute count of the cells of each kind in the sample and/or as a ratio between the two values;
   Hurst's coefficient $H_rE+(1-D)$, that can range from 0 to 1.

15. The method according to claim 14, wherein the said parameters are displayed in a chart comprising a collection of data illustrating the disease stage, wherein the data are arranged in tables, diagrams, spectra, graphs.

16. The method according to claim 1, wherein the collagen is stained with a stain having a threshold for each primary colour that varies between a minimum value of 0 and a maximum value of 255 intensity units (24 bit depth, 16 million colours BITMAP image analysis).

17. The method according to claim 16, wherein the stain is Sirius Red (Direct Red 80) and the stained hepatic collagen has the thresholds are 0-255 intensity units for red (R), 0-130 intensity units for green (G) and 0-255 intensity units for blue (B).

18. The method according to claim 1, wherein the diseases that involve chronic inflammatory processes are selected from hepatitis, pancreatitis, gastritis and prostatitis.

19. The method according to claim 18, wherein said image under observation is from a liver tissue bioptic sample.

* * * * *